United States Patent [19]
Alimpich et al.

[11] Patent Number: 5,818,444
[45] Date of Patent: Oct. 6, 1998

[54] METHOD, APPARATUS AND APPLICATION FOR OBJECT SELECTIVE BUT GLOBAL ATTRIBUTE MODIFICATION

[75] Inventors: Claudia C. Alimpich, Boulder; Gerald D. Boldt; Calvin Larry Doescher, both of Longmont; Joan Stagaman Goddard, Boulder; Luana L. Vigil, Longmount, all of Colo.; Minh Trong Vo, Mountain View, Calif.; James Philip Wittig, Boulder, Colo.

[73] Assignee: International Business Machines Corporation, Armonk, N.Y.

[21] Appl. No.: 696,762

[22] Filed: Aug. 14, 1996

[51] Int. Cl.⁶ .................................................. G06F 15/00
[52] U.S. Cl. ............................................................. 345/333
[58] Field of Search .................................... 345/333, 349, 345/350, 356, 357, 433

[56] References Cited

U.S. PATENT DOCUMENTS

| | | | |
|---|---|---|---|
| 4,464,652 | 8/1984 | Lapson et al. | 340/710 |
| 5,001,654 | 3/1991 | Winiger et al. | 364/523 |

(List continued on next page.)

FOREIGN PATENT DOCUMENTS

| | | |
|---|---|---|
| 2097540 | 12/1994 | Canada . |
| 0 587 394 A1 | 3/1994 | European Pat. Off. . |
| 0 622 728 A1 | 11/1994 | European Pat. Off. . |
| 4-361373 | 12/1992 | Japan . |
| 5-313845 | 11/1993 | Japan . |
| 6-4117 | 1/1994 | Japan . |
| 6-215095 | 8/1994 | Japan . |
| 7-129597 | 5/1995 | Japan . |

OTHER PUBLICATIONS

"Device Independent Graphics Using Dynamic Generic Operator Selection," *IBM Technical Disclosure Bulletin*, Apr. 1983, vol. 25, No. 11A, pp. 5477–5480.

"Error–Tolerant Dynamic Allocation of Command Processing Work Space," *IBM Technical Disclosure Bulletin*, Jun. 1984, vol. 27, No. 1B, pp. 584–586.

"Means for Computing the Max of a Set of Variables Distributed Across Many Processors," *IBM Technical Disclosure Bulletin*, Sep. 1990, vol. 33, No. 4, pp. 8–12.

"Graphical User Interface for the Distributed System Namespace," *IBM Technical Disclosure Bulletin*, Jul. 1992, vol. 35, No. 2, pp. 335–336.

"Graphical Query System," *IBM Technical Disclosure Bulletin*, Nov. 1993, vol. 36, No. 11, pp. 615–616.

"Configuration Data Set Build Batch Program," *IBM Technical Disclosure Bulletin*, Nov. 1993, vol. 36, No. 11, p. 571.

Self–Contained Reusable Programmed Components, *IBM Technical Disclosure Bulletin*, Jul. 1995, vol. 38, No. 7, pp. 283–285.

"IBM Printing Systems Manager for AIX Overview," *International Business Machines Corporation*, Second Edition, Feb. 1996.

(List continued on next page.)

*Primary Examiner*—Phu K. Nguyen
*Attorney, Agent, or Firm*—Jenkens & Gilchrist

[57] ABSTRACT

An application, method and apparatus for revision of attributes of selected objects as controlled by a computer system. The computer system has at least a visual operator interface, an operating system for operating applications within the computer system, and memory for storing the application therein. Selected objects, such as other applications, parts of applications such as cells in a spread sheet, or real objects such as printers, are designated for selected attribute revision. A global change operation for all of the designated objects having properties to be revised is selected. The attributes are revised as desired and the revised attributes are propagated to the designated objects. Also disclosed is a method, apparatus and application for indicating the desired revisions to the attributes using a model object. The model object method, apparatus and application is an alternative embodiment of the invention.

6 Claims, 10 Drawing Sheets

U.S. PATENT DOCUMENTS

| | | | |
|---|---|---|---|
| 5,062,060 | 10/1991 | Kolnick | 364/521 |
| 5,072,412 | 12/1991 | Henderson | 395/159 |
| 5,095,512 | 3/1992 | Roberts et al. | 382/56 |
| 5,117,372 | 5/1992 | Petty | 395/161 |
| 5,119,476 | 6/1992 | Texier | 395/157 |
| 5,121,477 | 6/1992 | Koopmans et al. | 395/156 |
| 5,140,677 | 8/1992 | Fleming et al. | 395/159 |
| 5,140,678 | 8/1992 | Torres | 395/159 |
| 5,164,911 | 11/1992 | Juran et al. | 364/578 |
| 5,206,950 | 4/1993 | Geary et al. | 395/600 |
| 5,208,907 | 5/1993 | Shelton et al. | 395/149 |
| 5,228,123 | 7/1993 | Heckel | 395/155 |
| 5,233,687 | 8/1993 | Henderson et al. | 395/158 |
| 5,247,651 | 9/1993 | Clarisse et al. | 395/500 |
| 5,249,265 | 9/1993 | Liang | 395/160 |
| 5,255,359 | 10/1993 | Ebbers et al. | 395/161 |
| 5,276,901 | 1/1994 | Howell et al. | 395/800 |
| 5,287,447 | 2/1994 | Miller et al. | 395/157 |
| 5,307,451 | 4/1994 | Clark | 395/127 |
| 5,315,703 | 5/1994 | Matheny et al. | 395/164 |
| 5,317,687 | 5/1994 | Torres | 395/159 |
| 5,317,730 | 5/1994 | Moore et al. | 395/600 |
| 5,367,619 | 11/1994 | Dipaolo et al. | 395/149 |
| 5,371,844 | 12/1994 | Andrew et al. | 395/155 |
| 5,377,317 | 12/1994 | Bates et al. | 395/157 |
| 5,388,255 | 2/1995 | Pytlik et al. | 395/600 |
| 5,394,521 | 2/1995 | Henderson et al. | 395/158 |
| 5,404,439 | 4/1995 | Moran et al. | 395/155 |
| 5,410,695 | 4/1995 | Frey et al. | 395/650 |
| 5,410,704 | 4/1995 | Norden-Paul et al. | 395/700 |
| 5,412,776 | 5/1995 | Bloomfield et al. | 395/160 |
| 5,414,806 | 5/1995 | Richards | 395/135 |
| 5,416,900 | 5/1995 | Blanchard et al. | 395/155 |
| 5,418,950 | 5/1995 | Li et al. | 395/600 |
| 5,428,554 | 6/1995 | Laskoski | 364/550 |
| 5,428,776 | 6/1995 | Rothfield | 395/600 |
| 5,438,659 | 8/1995 | Notess et al. | 395/155 |
| 5,450,545 | 9/1995 | Martin et al. | 395/700 |
| 5,454,071 | 9/1995 | Siverbrook et al. | 395/141 |
| 5,454,106 | 9/1995 | Burns et al. | 395/600 |
| 5,459,825 | 10/1995 | Anderson et al. | 395/133 |
| 5,459,832 | 10/1995 | Wolf et al. | 395/155 |
| 5,463,724 | 10/1995 | Anderson et al. | 395/148 |
| 5,473,745 | 12/1995 | Berry et al. | 395/157 |
| 5,479,599 | 12/1995 | Rockwell et al. | 395/155 |
| 5,481,666 | 1/1996 | Nguyen et al. | 395/159 |
| 5,483,651 | 1/1996 | Adams et al. | 395/600 |
| 5,487,141 | 1/1996 | Cain et al. | 395/135 |
| 5,491,795 | 2/1996 | Beaudet et al. | 395/159 |
| 5,497,454 | 3/1996 | Bates et al. | 395/158 |
| 5,497,484 | 3/1996 | Potter et al. | 395/600 |
| 5,678,014 | 10/1997 | Malamud et al. | 345/333 |

OTHER PUBLICATIONS

"IBM Printing Systems Manager for AIX Administrating," *International Business Machines Corporation*, 1995.

"Matching Three–Dimensional Objects Using a Relational Paradigm," *Pattern Recognition*, vol. 17, No. 4, pp. 385–405, 1984.

"A Multicolumn List–Box Container for OS/2," *Dr. Dobb's Journal*, May 1994, vol. 19, No. 5, pp. 90–94.

METHOD, APPARATUS AND APPLICATION FOR OBJECT SELECTIVE BUT GLOBAL ATTRIBUTE MODIFICATION

BACKGROUND OF THE INVENTION AND STATE OF THE PRIOR ART

1. Field of the Invention

The present invention relates to globally modifying, adding, removing (collectively referred to as "modifying") selected object attributes in designated objects, and more particularly relates to a method, apparatus and application utilizing a graphical interface for enabling such global revision of selected object attributes.

2. Description of Related Art

In computer systems, the user often must spend exorbitant amounts of time on system setup, especially in anticipating his usage of different objects during any one computer session (e.g. day, week, month etc.) Or even for one large job. Often the user must duplicate setups in multiple objects, for example multiple on-line printers used to print from a multitude of applications. This is done so that in any application requiring printing, the attributes associated with each of the printers that may be used, are the same. To continue with the printer example, this kind of setup is particularly critical when the printers are interconnected via a local area network (LAN) or some other type of network and, therefore, each printer is subject to use by a large number of users for printing of multiple documents (or parts of the sane document) requiring the printers to have the same attribute values.

In order to better understand the terms utilized in this patent application, a brief background definition section will be presented so that the reader will have a common understanding of the terms employed and associated with the present invention.

A "user interface" is a group of techniques and mechanisms that a person employs to interact with an object. The user interface is developed to fit the needs or requirements of the users who use the object. Commonly known user interfaces can include telephone push buttons or dials, or pushbuttons such as on a VCR or a television set remote. With a computer, many interfaces not only to allow the user to communicate with the computer but also allow the computer to communicate with the user. These would include (1) command-line user interfaces (i.e., user remembered commands which he/she enters, e.g. "c:\>DIR" in which "DIR" is a typical DOS command entered at the "C" prompt); (2) menu-driven user interfaces which present an organized set of choices for the user, and (3) graphical user interfaces, ("GUI") in which the user points to and interacts with elements of the interface that are visible, for example by a "mouse" controlled arrow or cursor.

An example of a GUI user interface is that which is offered by International Business Machines Corporation (IBM) under the name "Common User Access" ("CUA"). This GUI incorporates elements of object orientation (i.e., the user's focus is on objects and the concept of applications is hidden). Object orientation of the interfaces allow for an interconnection of the working environment in which each element, called an "object," can interact with every other object. The objects users require to perform their tasks and the objects used by the operating environment can work cooperatively in one seamless interface. With objected oriented programming using a GUI, the boundaries that distinguish applications from operating systems are no longer apparent or relevant to the user. While the invention is described in terms of object-oriented interfaces, such an interface is not required for the present invention.

In connection with this patent application, an "object" means any visual component of a user interface that a user can work with as a unit, independent of other items, to perform a task. By way of example, a spreadsheet, one cell in a spreadsheet, a bar chart, one bar in a bar chart, a report, a paragraph in a report, a database, one record in a database, and a printer are all objects. Each object can be represented by one or more graphic images, called "icons," with which a user interacts, much as a user interacts with objects in the real world. (NOTE: In the real world, an object might be an item that a person requires to perform work. As an example, an architect's objects might include a scale, T-square, or a sharp pencil, while an accountant's objects might include a ledger and a calculator.) However, it is not required that an object always be represented by an icon, and not all interaction is accomplished by way of icons. For example, and as will be seen hereinafter, a user can interact with an object by opening a window that displays more information about the object and includes a variety of mechanisms for interacting with the object.

While classification of objects may follow many different definitions, each class of objects has a primary purpose that separates it from the other classes. A class may be looked at as a group of objects that have similar behavior and information structures. In addition, each of the objects enumerated and defined below may contain other objects. There are three primary classes of objects. Each is discussed below.

(1) Container Object: This object holds other objects. Its principal purpose is to provide the user with a way to hold or group related objects for easy access or retrieval. An operating system, e.g. OS/2® (a trademark of IBM Corporation) or Windows® (a trademark of Microsoft Corporation), typically provides a general-purpose container, for example a folder or a program group—that holds any type of object, including other containers. For example, imagine a program group (or folder) labeled "PRIVATE FOLDER—ICONS;". In the program group are three folder icons labeled "REPORT", "PORTFOLIO" and "LETTERS". By selecting with a mouse or other pointing device the icon "PORTFOLIO", another window may open showing three more icons labeled "OIL PAINTINGS", "WATERCOLORS, " and "PORTRAITS". In turn, selecting any of those three icons may open additional windows with further icons representing further subdivisions, or cross-references (e.g., "CUSTOMERS").

(2) Data Objects: The principal purpose of a data object is to convey information. This information may be textual or graphical information or even audio or video information. For example, a business report displayed on the computer monitor may contain textual information concerning sales of "gadgets" over the past few years (text object) to all customers and also may contain a bar chart (graphic object) to pictorially depict, on the same monitor screen, the sales information.

(3) Device Objects: The principal purpose of a device object is to provide a communication vehicle between the computer and another physical or logical object. Many times the device object represents a physical object in the real world. For example, a mouse object or icon can represent the user's pointing device, and a modem object can represent the user's modem, or a printer object or icon can represent the user's printer. Other device objects are purely logical, e.g. an out-basket icon representing outgoing electronic mail; a wastebasket object or icon representing a way the user may "trash" or dispose of other objects.

As can be seen from the foregoing, a class of objects may be defined as a description of the common characteristics of several objects, or a template or model which represents how the objects contained in the class are structured. While there are further ways in which to define objects and class of objects, typically each class of objects will include similar attributes, the values of which the user will alter, modify, replace or remove from time to time. (For a more complete discussion of objects, attributes, object oriented interfaces etc., see "Object Oriented Interface Design: IBM Common User Access" (published by Que, ISBN 1-56529-170-0).

As mentioned above, the detail pertaining to objects is provided for background only. Object oriented interfaces are not required for the present invention.

Current graphical interface architectures do not provide a mechanism to facilitate changing the value of an attribute across many (but possibly less than all) objects of the same class. Additionally, there is no effective mechanism for capturing the values of an attribute for one object and propagating the values to other objects of the same class (i.e., making a global change).

There are some word processors and graphical operating systems which afford a similar function, but each has limitations which distinguish it from the solution presented here. For example, Microsoft Word® allows the user to select multiple objects (e.g. paragraphs). Thereafter, with the Format/Paragraph operation, the user is presented with a dialog that allows modified characteristics to be set for each selected paragraph. WordPerfect® for Windows (a trademark of Novell Corporation) provides a method for selecting multiple objects and changing the attributes for all of the objects at the same time but the method, much like that in Microsoft Corporations Words, is restricted to boolean and single valued attributes. OS/2® and Windows® allow multiple file or program objects to be selected and then a single operation (e.g. delete) to be performed on them, but it is limited to a single operation, and cannot be used to change attributes that have multiple values, where the values may be in different formats.

Other attempts have been made to apply global changes to attributes of objects which are of the same name. In U.S. Pat. No. 5,001,654 issued on Mar. 19, 1991 to Wineger et.al, at the choice of the operator a change of the value of properties of a component may be made to apply globally to all components with the same name as the amended component, or be applied solely to the changed component. As shall become apparent from the following description, the present invention differs in that a local value change to an attribute may be propagated to "selected" objects of the same "class", not necessarily all of the objects of the same class. Additionally, if desired, the attributes and their values may be edited for the class and the remaining may then be propagated. Moreover, as also shall become evident, the changes to the values of attributes is permitted to a wide range of attribute types including attributes that have multiple values, where the values may be in different formats.

SUMMARY OF THE INVENTION

In view of the above, it is a principal object of the present invention to provide a graphically oriented method, application and apparatus to facilitate the operator or user in altering attribute values globally to selected objects of the same class.

Another object of the present invention is to permit such alteration globally of a wide range of attribute types including attributes that have multiple values, where the values may be in different formats.

Yet another object of the present invention is to permit the capture of values of selected attributes of a designated object and then propagation of those to selected other objects of the same class.

Still another object of the present invention is to provide an application which may be employed in a number of different computers, may be transported between different computers, and may be loaded into various computer environments.

The invention is carried out in the following environment and utilizing the following briefly set forth method for revision of the value of attributes or the designated properties of selected objects as controlled by a computer system. The computer system has at least a visual operator interface, an operating system for operating applications within the computer system, and memory for storing at least part, preferably all, of an application. The method comprises the steps of: designating objects having properties to be modified and selecting a global change action item. The attributes of the object may then be modified as desired, and the modified attribute values may be propagated globally to the selected objects. Additionally, further attributes from an attribute list associated with the designated objects may be selected, and selected ones of the modified attributes may be propagated globally to the designated objects.

Other objects of the invention and a more complete understanding of the invention may be had by referring to the following description taken in conjunction with the accompanying drawings

DESCRIPTION OF THE ILLUSTRATIVE EMBODIMENT(S)

Figure 1:
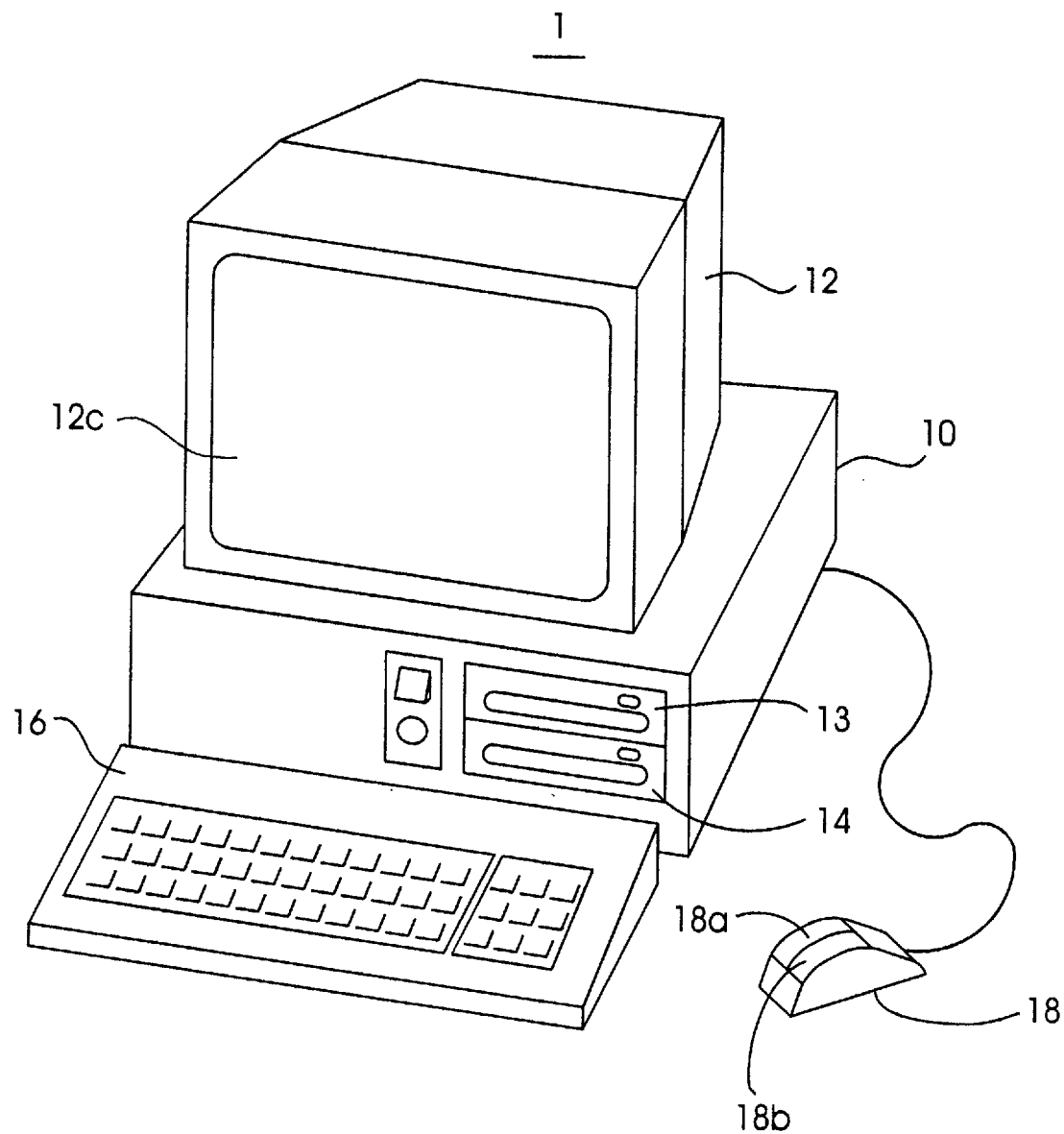
FIG. 1 illustrates a typical computer system which may be employed to practice the novel method and application of the present invention.
Figure 2:
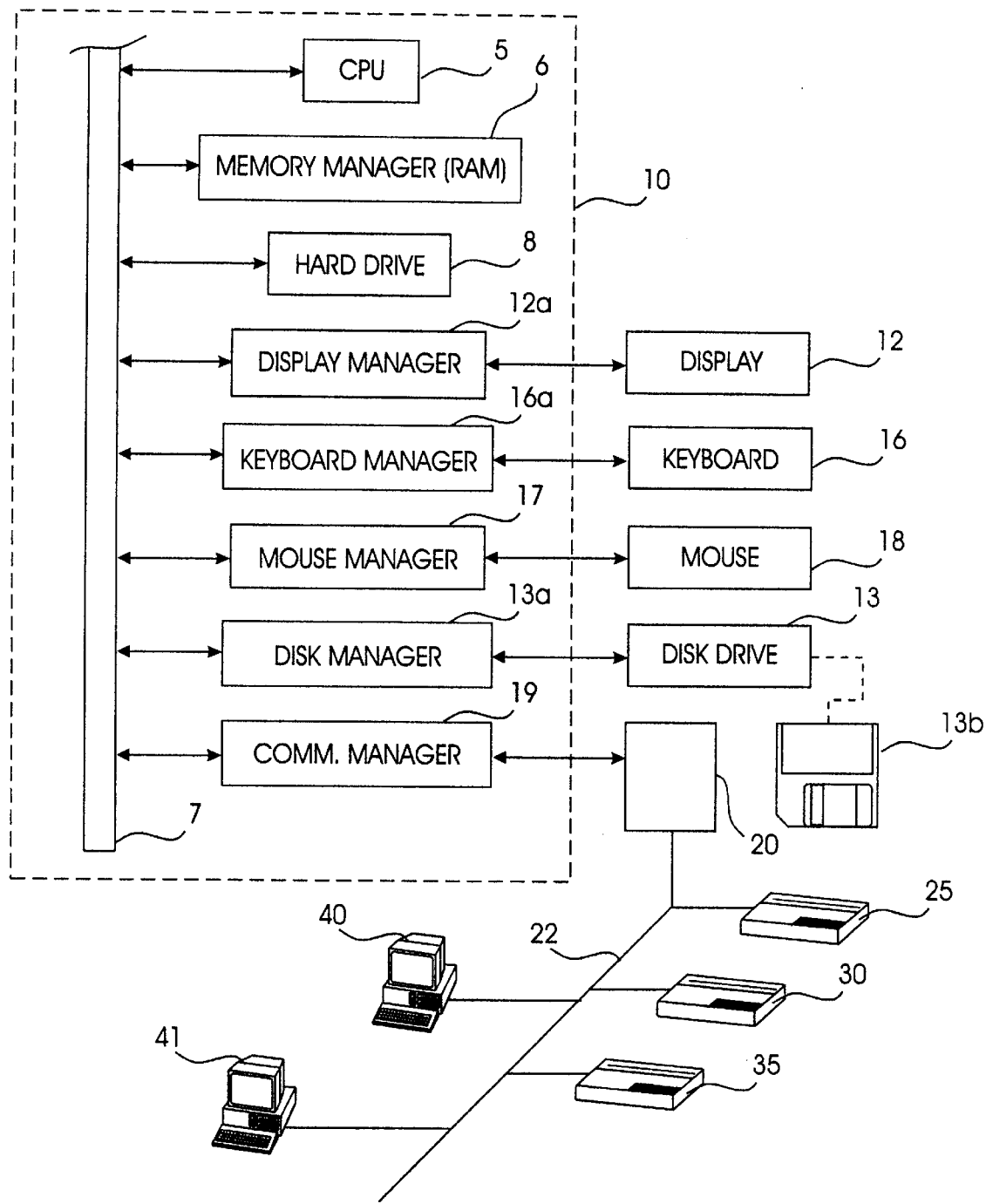
FIG. 2 is a block diagram illustrating a sample configuration of the computer system shown in FIG. 1.

Turning now to the drawings, and especially FIGS. 1 and 2, FIG. 1 diagrammatically shows a computer system 1 which may be connected to a Local Area Network system (LAN 20) as shown in FIG. 2. As will become more evident from the following discussion, these systems may be employed for globally changing attribute values of selected objects in accordance with the present invention.

Figure 3:
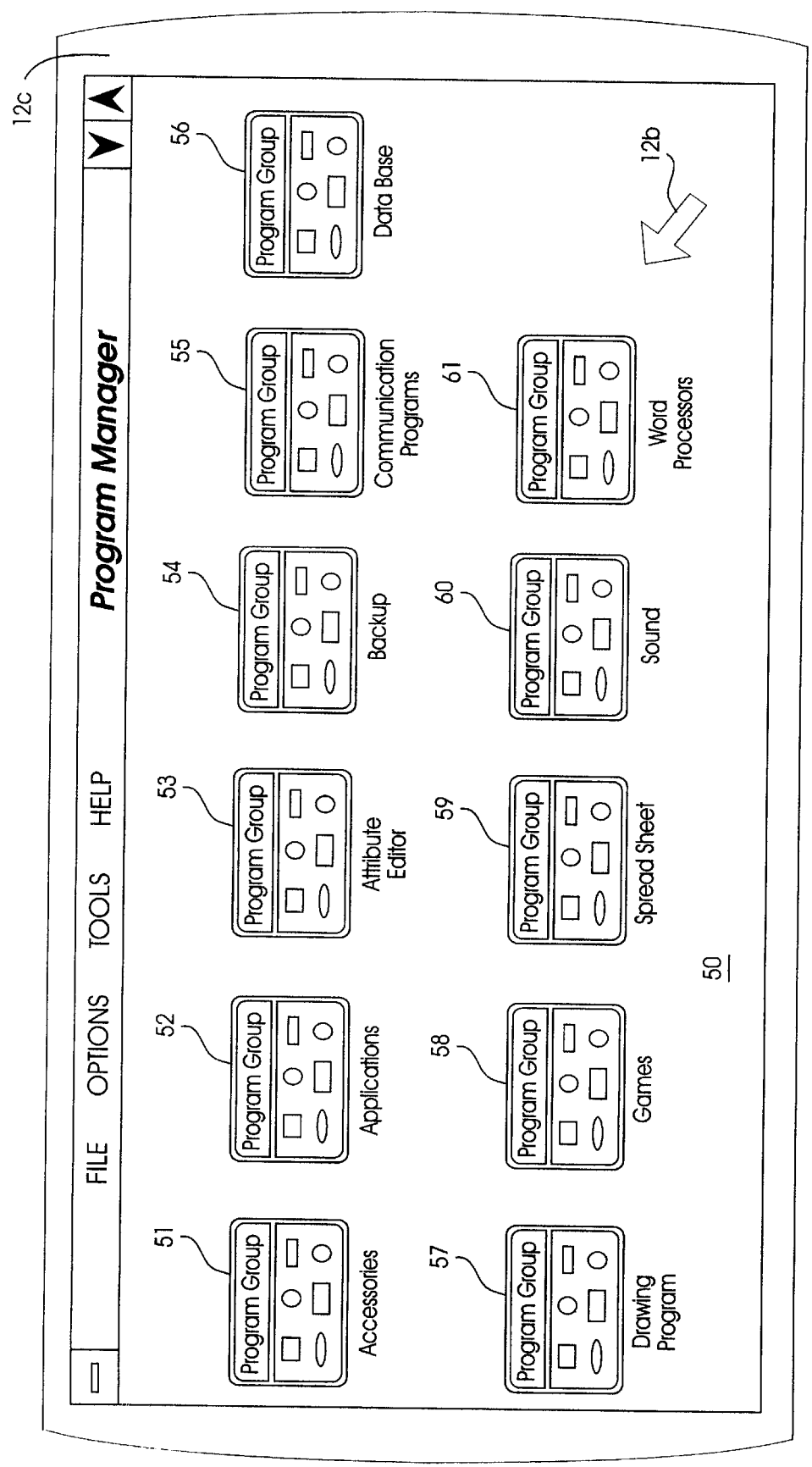
FIGS. 3, 3a, and 3b illustrate the "Systems Window" dialog as well as an "Action Menu" dialog as initiated by actions taken by the user and the system to carry out the novel method of the present invention and incorporated as part of the application of the present invention.

As shown in FIG. 1, the computer system 1 comprises a main chassis 10, a display means or monitor 12, a connected keyboard 16 and a pointing device, in the present instance a mouse 18 which is operator controlled to move a pointer cursor 12b (shown in FIG. 3) on the display or monitor screen 12c. As shown in FIG. 2, the chassis 10 includes a central processing unit, or "CPU" 5, a memory manager and associated random access memory, or "RAM" 6, a fixed disk or hard drive 8 (which may include its associated disk controller), a display manager 12a which is connected externally to the chassis 10 of the display 12; a keyboard manager 16a, which through flexible cable (not shown) is connected to the keyboard 16; a mouse manager 17 (which in some instances may form part of the display manager 12a, and may be in the form of a software driver) for reading the motion of the mouse 18 and its control mouse buttons (MB) 18a and 18b, shown in FIG. 1. A disk manager or controller 13a which controls the action of the disk drive 13 (and an optional drive such as a magneto-optical or CD ROM drive 14) shown in FIG. 1, rounds out most of the major elements of the computer system 1.

The pointer element or cursor 12b can be moved over the display screen 12c by movement of the mouse 18. The mouse buttons (MB) 18a and 18b give commands to the operating system, usually through a software mouse driver provided by the mouse manufacturer. With the first mouse button (MB) 18a the operator can select an element indicated on the display screen 12c using the pointer or cursor 12b, i.e., signify that an action subsequently to be performed is to be carried out on the data represented by the indicated element on the display screen 12c. The system normally gives some visual feedback to the operator to indicate the element selected, such as a change in color, or a blocking of the icon. The second mouse button (MB) 18b may be a menu button, if desired. Conventionally, when the operator presses button 18b, a selection menu or dialog with system commands will appear can the display screen 12c. The operator may select an icon or item from the selection menu or input information into the dialog box as appropriate using the cursor 12b and the first mouse button (MB) 18a.Some menu items, if selected, may call up another menu or submenu for the operator to continue the selection process.

The use of a mouse and selection menus is well known in the art, for example U.S. Pat. No. 4,464,652 to Lapson et al. describes a selection menu of the pull-down type in combination with a mouse. It should be recognized, of course, that other cursor pointing devices may be employed, for example a joystick, ball and socket, or cursor keys on the keyboard.

The foregoing devices (and software drivers therefore) within the chassis 10 communicate with one another via a bus 7. To round out the computer system 1, an operating system (not shown) must be employed. If the computer system is a typical IBM-based system, the operating system may be DOS-based and include a GUI interface such as contained in OS/2®, or WINDOWS®, or other operating system of choice. If the computer system is based upon RISC (reduced instruction set computer) architecture, then the operating system employed may be, in the instance of an IBM-based RISC architectured System/6000®, AIX. Alternatively, if the computer system 1 is a large host computer, such as a an IBM 3090, it may be running an operating system such as MVS or VM. This operating system normally includes a print service facility called PSF, which is a system-wide resource manager, which takes a "job" which has been formatted for a particular printer, and sends certain files, such as fonts, special commands and the like to the printer before sending the file to be printed.

By way of background only, if in the illustrated instance the computer system 1 is a RISC system, such as the IBM RISC/6000® computer system, it may be programmed to send a Page Description Language (PDL) called IPDS (Intelligent Print Data Stream) to a printer. However, other page description languages such as "PostScript" or "PCL" are equally applicable. Such page description languages as "PostScript" or "PCL" are normally, but not always, associated with low-end computer systems, and the present invention is equally applicable to those languages. The PDL sets the format of the page to be printed (i.e., start at 1" down and 1" to the right of the upper left corner of the page) and sends it to a rasterizer which takes the description, interprets it, error checks it and builds a pagemap which is logically composed of a two-dimensional array of bits, sometimes referred to as a bitmap. The pagemap is then rearranged and the words are transformed to a page in row major order. The words are then sent to the printer, and as is conventional, the printer printhead receives the words sent to it in a manner that allows it to print across the paper.

In the illustrated instance, the computer system 1 includes an I/O (Input/Output) manager or communications manager 19 (shown in FIG. 2) which serves to link the computer system for communications with the outside world such as to a systems printer, a modem or a LAN controller (such as a Token ring or ETHERNET or even through a modem employing SDLC) such as shown at 20 in FIG. 2. The LAN controller may be incorporated inside the computer system 1 or located externally as shown diagrammatically in FIG. 2, as desired. The LAN controller 20 may connect to other computer systems 10 and 41 as well as to other printers such as printers 25, 30 and 35 by communications cable 22 and the like. However the method and application of the present invention works equally well with multiple objects serviced by a single computer system or with multiple objects such as printers or servers which service the computer system or systems. Moreover, the principals of operation make the operation of global modification to attributes of selected objects, applicable to multiple objects on a single computer system.

Assume that the operator or system user decides to change the values of selected attributes of some objects within his control. By way of a first example, assume that the system operator has the capability of interconnecting, through the LAN 20, other computer systems and printers, such as described with reference to FIG. 2, and it is desired to change certain attributes of multiple printers attached to the LAN 20.

As is conventional, when the user desires to open one, or more windows, the mouse 18 is moved until the pointer 12b is in contact with the desired icon. Depending upon the operating system, simply depressing the left mouse button 18b may act to select and open the program group. In other operating systems, rapidly depressing the left mouse button twice selects and opens the program group. In either instance, opening the icon displays icons therein representative of certain programs which have been collected within the particular icon. Throughout this discussion, however, assume that depressing the mouse button 18a effects the desired action, regardless of whether it takes one or two depressions. Moreover, iconic representations of the same program or data may appear in more than one icon, or may be associated with more than one program within more than one group. For example, a particular printer may appear associated with programs in a data base icon 56, word processor icon and spread sheet icon.

Figure 4:
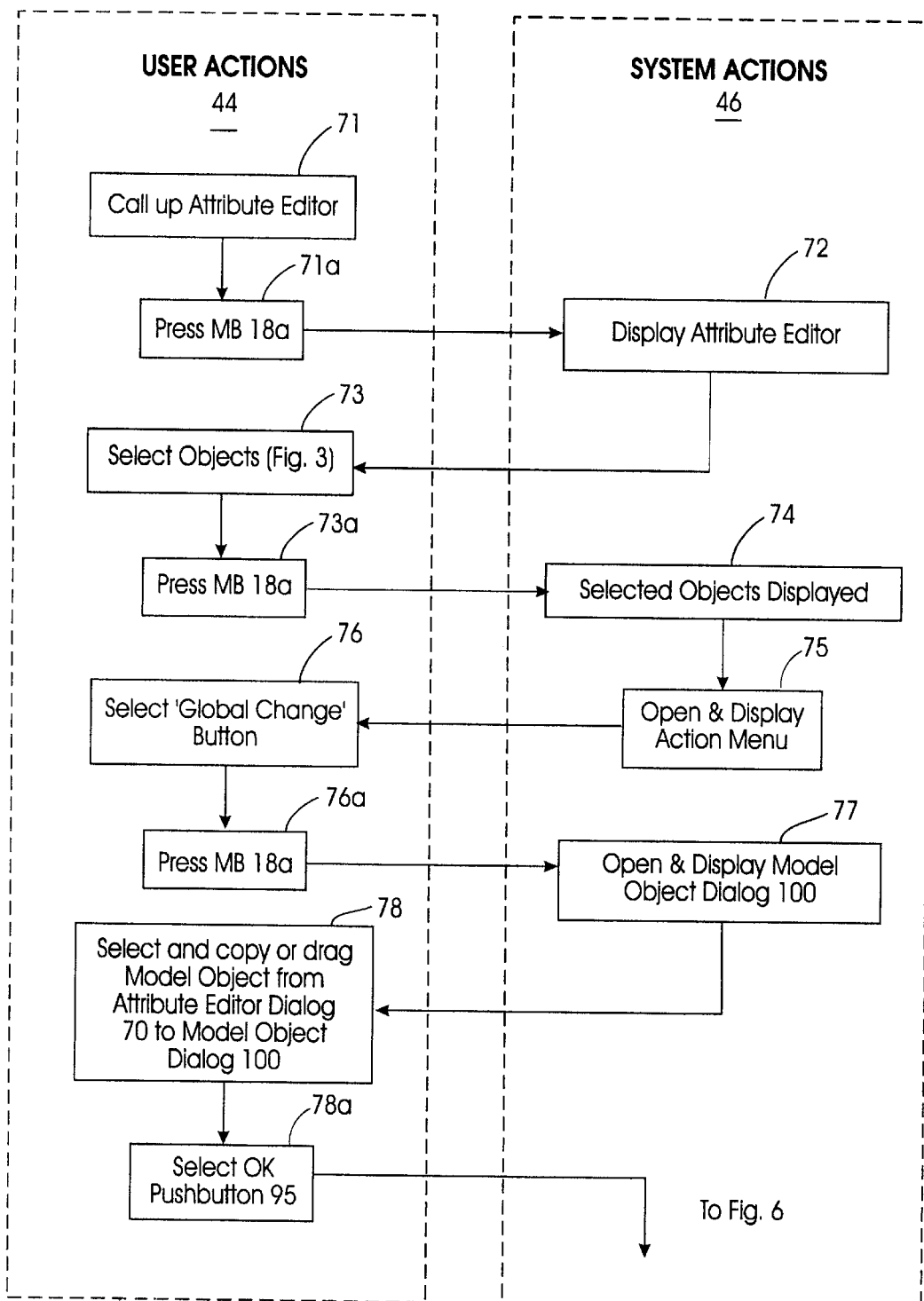
FIG. 4 is a block diagram or flow chart illustrating both user actions and system actions to accomplish that which is shown in FIGS. 3A and 3B.
Figure 6:
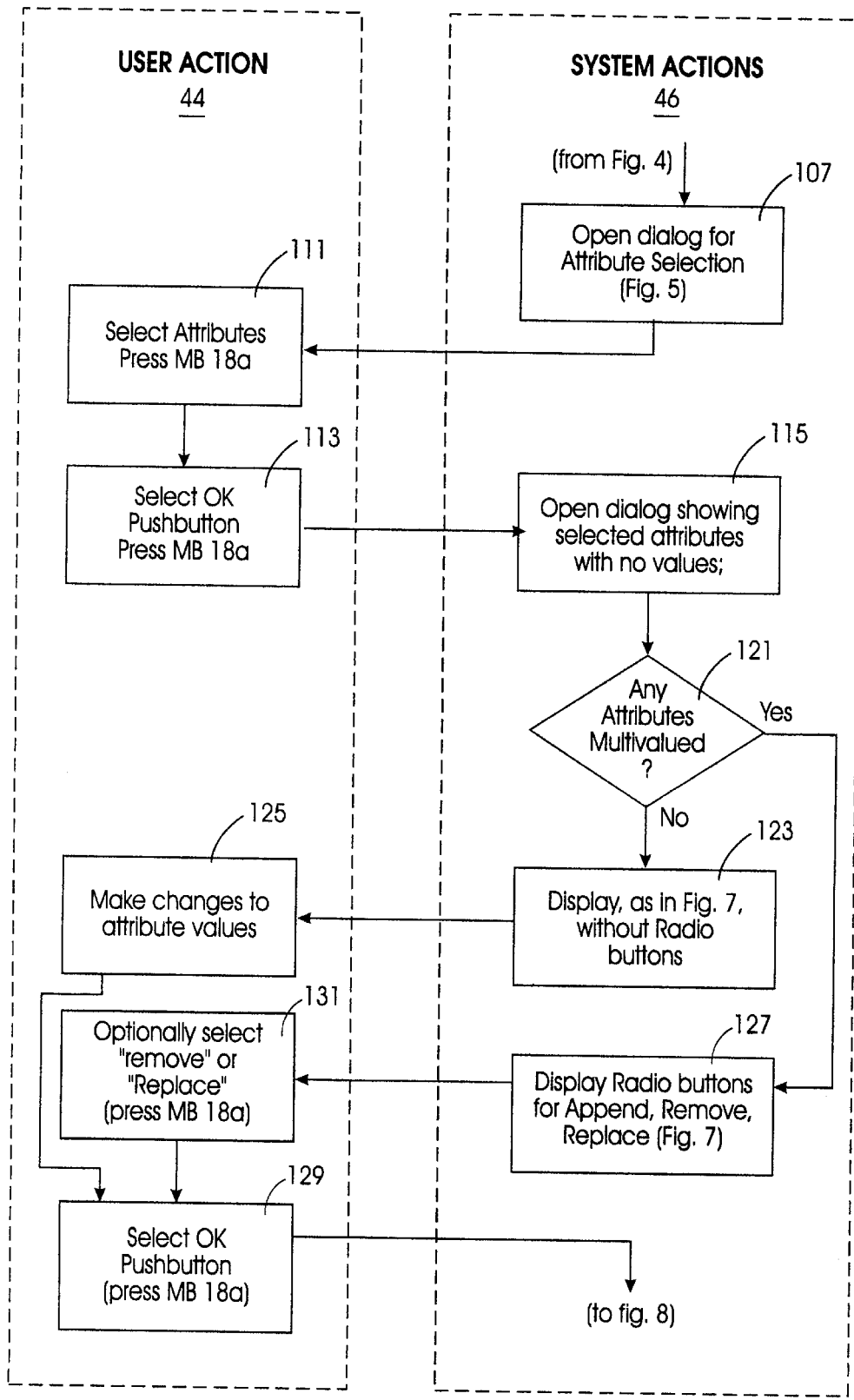
FIG. 6 is a block diagram or flow chart illustrating both user actions and system actions to accomplish that which is shown in the screen displays of FIGS. 5 and 7.

As shown in FIG. 4, and to facilitate an understanding of the "User Actions" and "System Actions" carried out by the present invention, the flow charts of FIGS. 4 and 6 are thus partitioned as by light dashed lines to form boxes 44 and 46 respectively. As implied by their titles, the user sits in front of the display screen 12c, taking the actions set forth in the logic boxes in box 44, while the system takes the actions, as a result of the user actions, set forth by there logic boxes in box 46. The user may call up the Systems Window by placing the pointer cursor 12b on the System s Window icon (not shown) and pressing the first mouse button (MB) 18a, which opens the Systems Window 70.

Figure 3A:
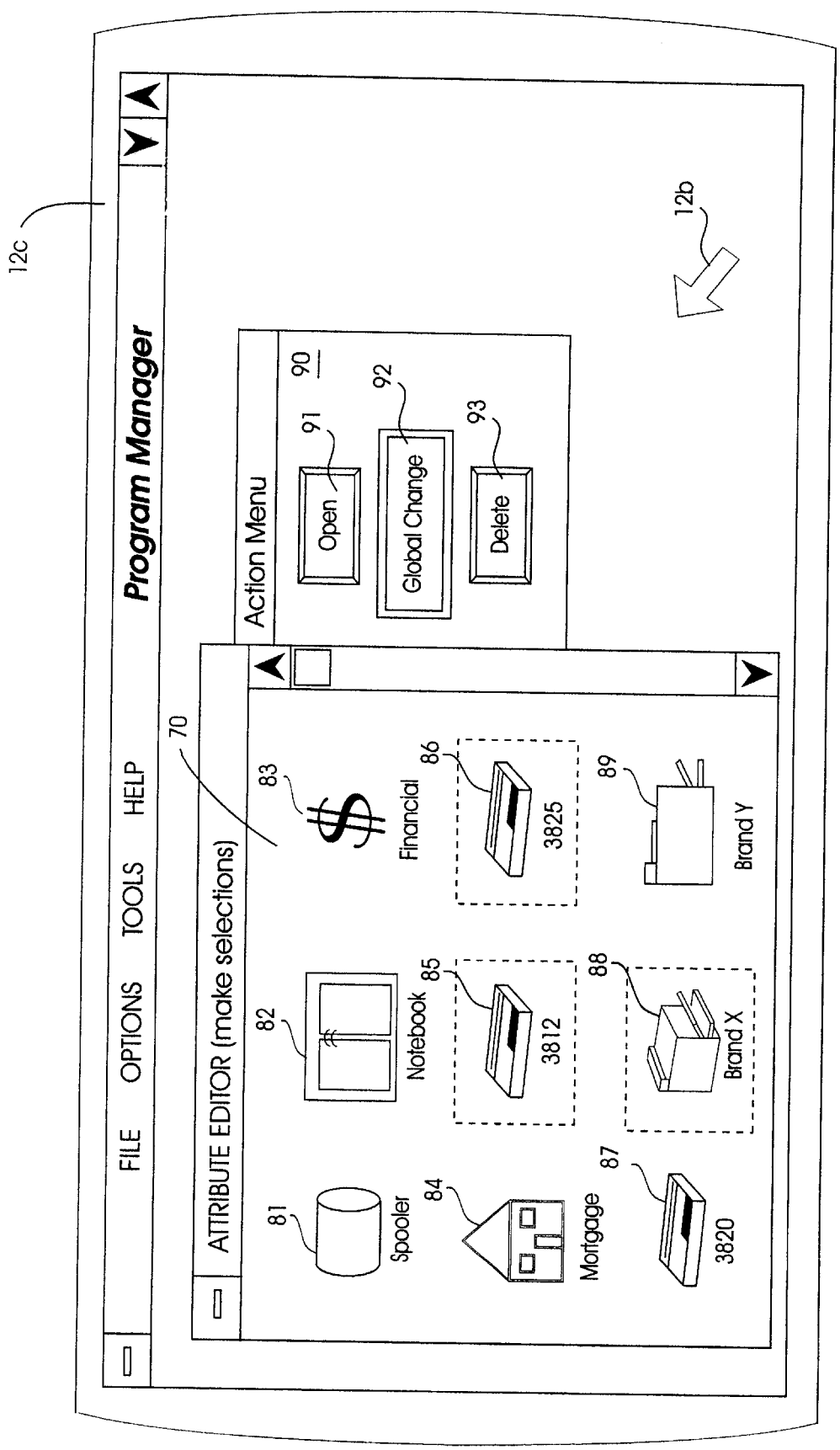
Figure 3B:
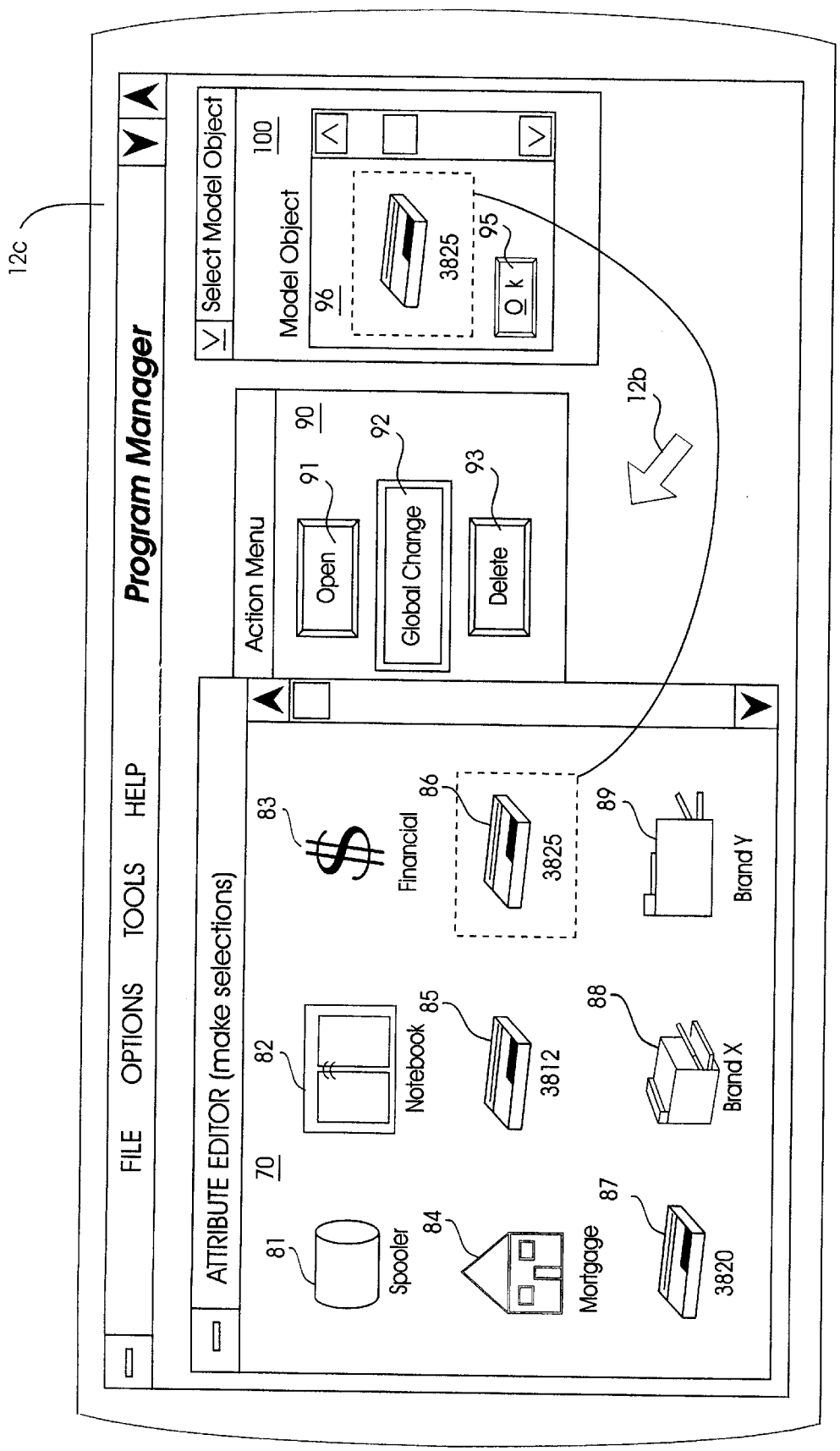

Referring now to FIG. 3A, the display screen 12c of the monitor 12 displays the labeled "Systems Window" dialog 70. As illustrated, and by way of example only, the Systems Window dialog 70 shows a plurality of icons 81–89 respectively, which represent under the CUA classification scheme, either device objects, such as spooler 81, printers 85–89; data objects, such as notebook 82, or container objects, such as financial 83 or mortgage 84 packages. It is recognized that each of the classifications may contain other objects which can be classified in other of the CUA object classifications or even classes that the user defines for his or her own purposes.

In accordance with the invention, the user selects the objects, the attributes of which it is desired to modify, add, append, remove or replace (hereinafter collectively referred to as "modify"), and selects the global change button 92. After the attribute values are modified as desired, the attribute value modifications are propagated to the selected or designated objects.

To this end, assume that the user selects three objects for modification of their attribute values. Of the five printers represented as icons 85–89, assume that the user selects printers 85, 86 and 88. (An IBM Model 3812, IBM Model 3825, and a Brand X printer, respectively), by placing the cursor pointer 12b on each of the desired printers 85, 86, or 88 and depressing mouse button 18a. With respect to FIG. 4, the forgoing encompasses logic steps 73 and 73a. The selection is indicated or displayed, in the present instance, by the light dashed line circumscribing the icons 85, 86 and 88 (logic step 74, FIG. 4). It should be recognized that any convenient means may be employed for indicating user selection, such as color change. As illustrated in FIG. 4 in logic step 75, this results in opening of an action menu dialog 90 with three on-screen buttons, 91–93 for opening an icon with button 91, for deleting an icon as with button 93 and of greater concern, a global change button 92. The global change button 92 is then selected by placing the cursor pointer 12b on button 92 and depressing mouse button 18a.

It is important to recognize that the steps of the present invention discussed above, may be arranged in any convenient order. For example, global change could be selected prior to the selection of designated objects. Moreover, modification to the attribute values of a model object could be made before selection of global change or the designation of objects to which the modified attribute values apply. Clearly, however, the invention does require at some point, the selection of a model object, the designation of objects to which the modification must be made, a global command for application of the modified attributes to the designated objects, the modification of the attributes of the model or template and the propagation of the modifications to the designated objects.

Figure 5:
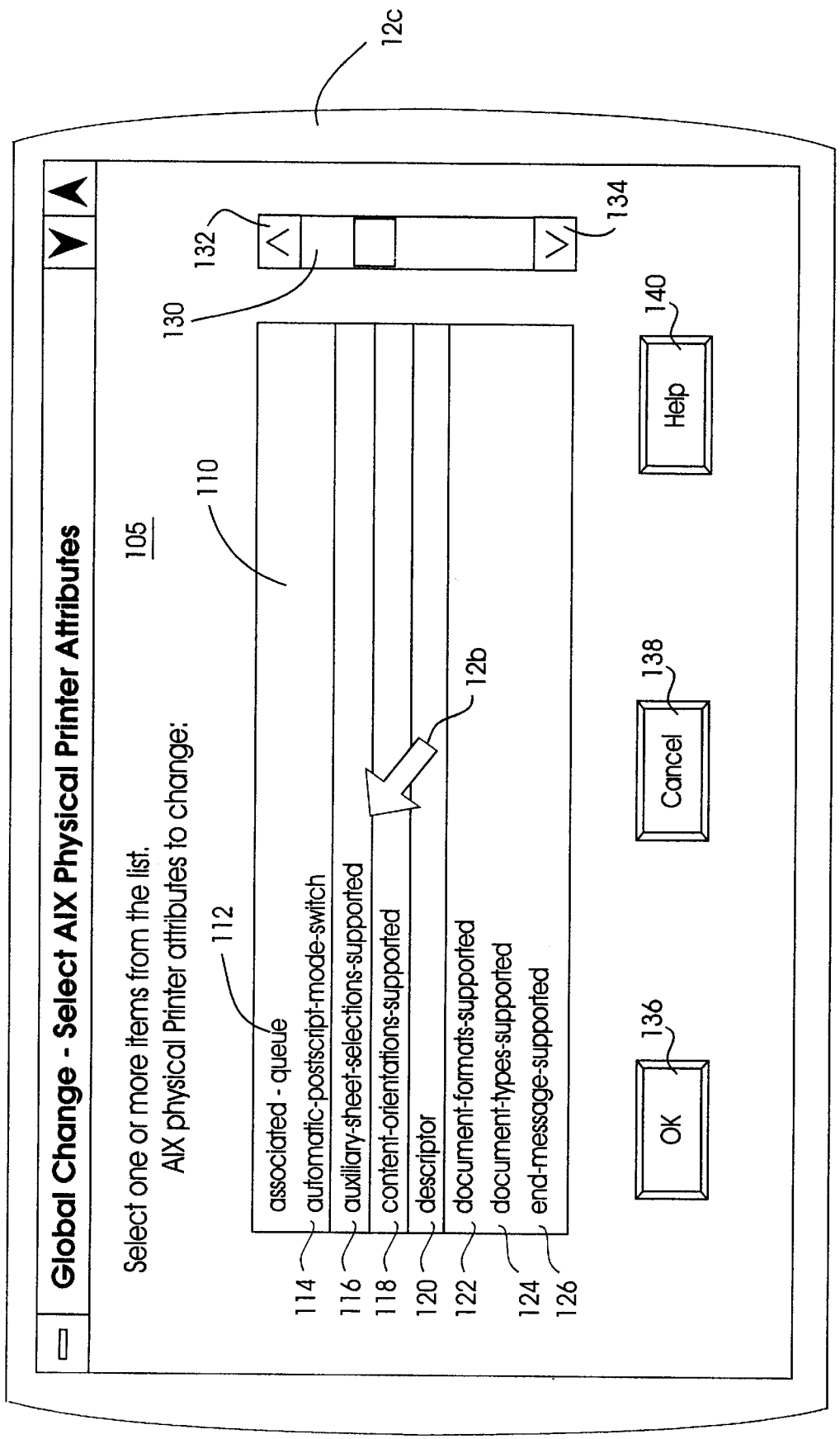
FIG. 5 is a typical screen display illustrating yet another step in the novel process of the present invention and utilizing, as an example, printer attributes, selected values of which are to be changed and selection of those desired for such change by the operator.

Turning now to FIG. 5, and assuming that what is desired is to modify certain physical printer attributes of the printers 85, 86 and 88 (FIG. 3A), and that in the illustrated instance the printers are operating under control of computer systems utilizing an AIX operating system. The dialog 105 contains a window 110 with a typical vertical scroll bar 130, containing conventional up and down pointers 132 and 134 respectively, for controlling, upon selection by the cursor pointer 12b under mouse 18 control, a scrollable list 112 of printer attributes. Several of these attributes are listed in the window 110. By way of example only, the number corresponding to the identification number (#) in FIG. 5, the meaning of these attributes, whether they are single valued (SV), multivalued (MV), boolean (BOO) or complex (COM) is set forth in the table below:

| # | Attribute | Description | Value |
|---|---|---|---|
| 112 | associated-queue | Job Queues, by name | SV |
| 114 | automatic-postscript-mode-switch | Description of printer operation. Yes/No, query | BOO, or SV |
| 116 | auxiliary-sheet-selections supported | job sheets in front of job; separator sheets for job, sheet color etc. | MV |
| 118 | content-orientations-supported | Landscape, portrait, reverse landscape etc. | MV |
| 120 | descriptor | descriptive text string by user to give some message to other system users | SV |
| 122 | document-formats-supported | ASCII, PostScript, PPDS, PCL etc. | MV |
| 124 | document-types-supported | overlays, page segments | MV |
| 126 | end-message-supported | job complete | BOO, SV |

Assuming, for example, that the user wishes to modify the attribute 116 (auxiliary-sheet-selections-supported) and attribute 120 (descriptor). These two items are selected by the mouse 18 and the cursor pointer 12b, and are indicated by logic steps 107 and 111 respectively in FIG. 6, and the lines surrounding the selected items in the list 110 of dialog 105.

Figure 7:
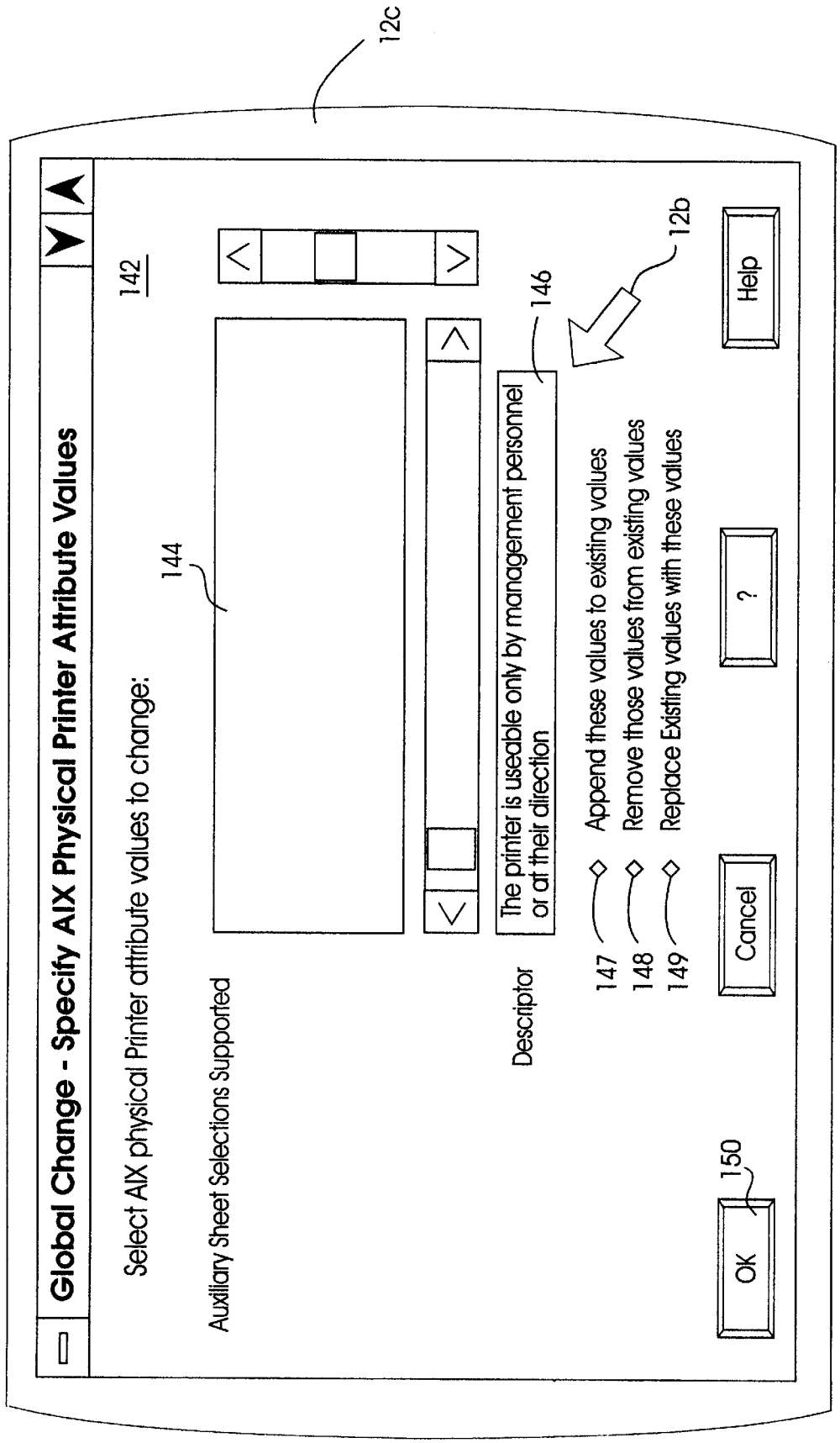
FIG. 7 is another screen display illustrating yet another step in the novel process of the present invention.

As shown in FIG. 5, the user may cancel the operation, if desired by selecting the cancel button 138, ask for help by selecting the help button 140, or if the user decides to continue, by selecting the OK button 136. (See logic step 113 in FIG. 6). Selecting the OK button 136 results in the system opening dialog 142, FIG. 7, showing selected physical printer attribute values to change, with no values depicted in the window 144 for attribute 116 "auxiliary sheet selection supported," nor in the window 146 for the attribute 120 "descriptor." The attributes may be keyboard entry by the user, and whatever they may be, the individual ones may be tagged by appropriate selection of the radio buttons 147, 148 and 149. These buttons serve respectively to append, remove or replace the values. The logic that serves to prepare the modified attribute values for propagation is depicted as logic steps 121, 123, 125, 127, 129 and 131. After the values have been tagged, the OK button 150 may be selected, again as by cursor pointer 12b as operated by the mouse 18 and mouse button 18a.

Figure 8:
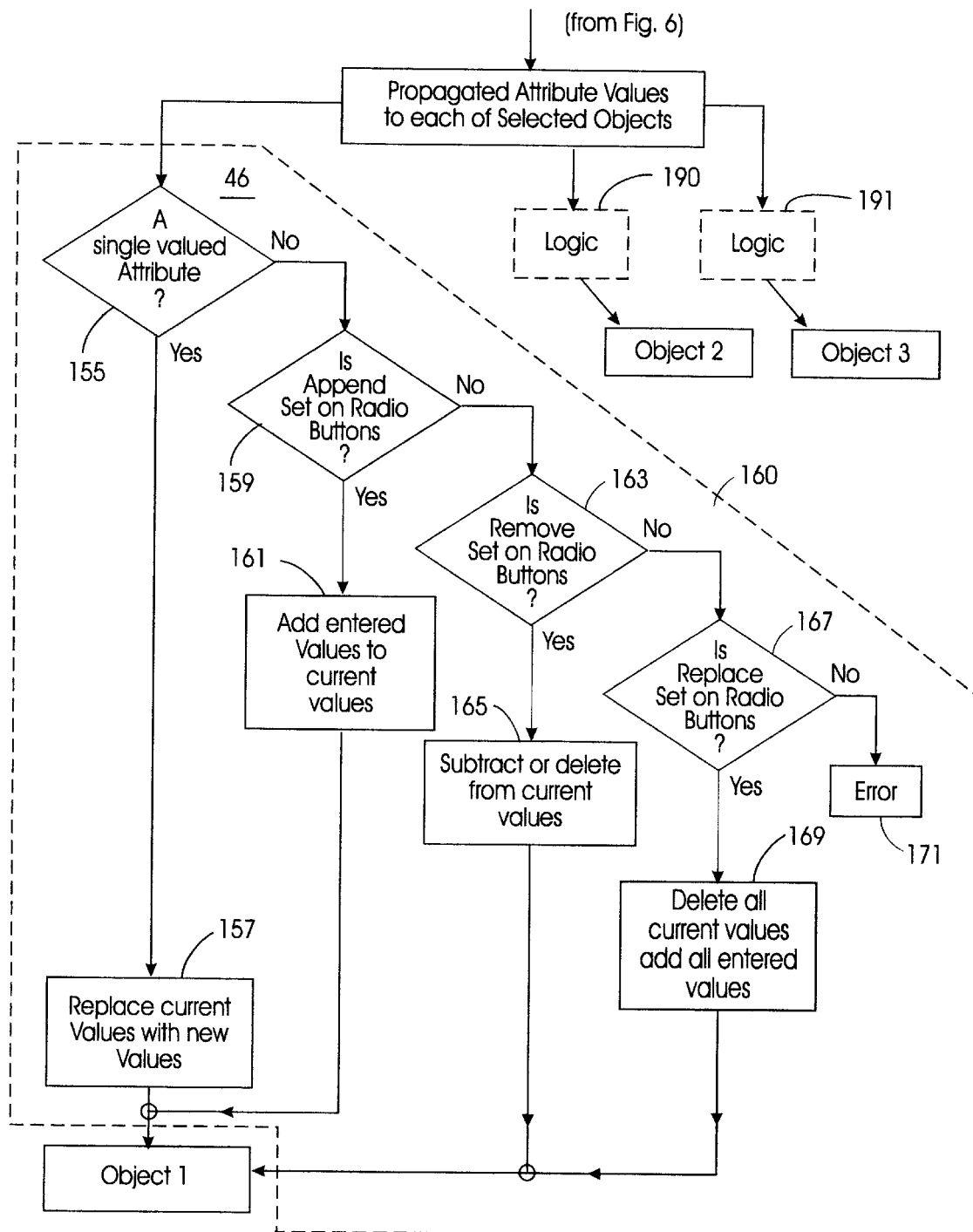
FIG. 8 is a logic diagram flow chart illustrating how the attributes are changed at the selected objects whether the change is single value, or the change is to be appended, removed, or replaced and regardless of the attribute type.

Upon selection of the OK button 150 using the mouse as in logic step 129, the system propagates the attribute values to each of the selected objects, in the illustrated instance the selected printers. In FIG. 8, the printers have been relabelled object 1, 2 and 3, each of the objects including associated software or hardware logic control to permit modifying selected existing values in the attribute list associated with each of the objects. One particular logic scheme 160 is shown in dashed lines around the logic boxes connected to the object 1. The logic schemes associated with objects 2 and 3 and labeled 190, 191 respectively, are identical to logic scheme 160, hereinafter described.

The logic scheme 160 may be arranged in any convenient manner. In software, an if-then-else scheme for handling "append," "remove" or "replace" may conveniently be utilized. Other schemes, such as a "decision tree" scheme depicted in logic scheme 160 may be utilized. Either scheme will work equally well and the scheme illustrated is only for ease of understanding. As shown in FIG. 8, the propagated attribute values go first to decision logic 155 to first ascertain whether the attribute is single-valued. If yes, the current value of the attribute is replaced as at logic block 157. If the attribute value is not single, the next decision logic block 159 determines which one of the radio buttons is set on (FIG. 7). In the present instance since the append button 147 is set on, the value is added, as at logic block 161, to the current value of the attribute of object 1. If the append button is not selected, then the decision logic block 163 is queried to determine if another radio button, in the illustrated instance the "remove" radio button 148 has been selected. If it has, then the value is subtracted or deleted from the selected objects. If the remove button is not selected, then decision logic 167 asks if the "replace" radio button 149 (FIG. 7) has been selected. If so, all current values associated with the existing attribute will be deleted and replaced by the new or changed values. This latter step is illustrated in logic box 169.

An alternative embodiment of the invention utilizes a model object dialog box. Referring now to FIG. 9, suppose the user has selected the objects of interest and has selected the global change button 92 as described with reference to FIG. 3A. The user now is prompted for and selects a model object from the collection of objects selected. As shown in FIG. 9, suppose that of the three printers selected, the user desires the IBM 3825 printer object 86 to be the model object. This selection is reflected in FIG. 9 in window 100. The model object 96 is IBM printer 3825. The system then displays the attribute options and the presently selected attributes for the selected model object 96. The user then modifies the attributes as desired and, upon completion, selects a pushbutton labeled "OK" or "propagate changes." The attribute modifications then are propagated to all of the selected objects.

Of course, other means may be employed to identify the model object for attribute value modification. For example, after selection of the model printer object 86, the icon may be copied to the model object dialog window 96 by utilization of the conventional pull down FILE menu found in most operating systems. Alternatively, the object dialog window 96 may contain a scrollable listing, either by name or icon, of objects contained in the attribute dialog 70 with one object being capable of being selected. Regardless of scheme, after the model or model object is selected, selection by the user of the OK button 95 using the mouse 18, as at logic step 78a (FIG. 4) causes the system to open dialog 105, (FIGS. 5 and 6).

Although the invention has been described with a certain degree of particularity, it should be recognized that elements thereof may be altered by person(s) skilled in the art with out departing from the spirit and scope of the invention. The invention is limited only by the following claims and their equivalents.

What is claimed is:

1. An application for revision of the value of attributes of selected objects as controlled by a computer system having at least a visual operator interface, an operating system for controlling the operation of program applications within the computer system, and memory for storing a program application, the application comprising:

means for designating objects, having attributes to be altered, modified, added or deleted (collectively, "revised");

means for selecting a global change operation for all of the designated objects having attributes to be revised;

means for revising the attributes as desired; and means for propagating the revised attributes to the designated objects.

2. An application for revision of the value of attributes of selected objects as controlled by a computer system having at least a visual operator interface, an operating system for controlling the operation of applications within the computer system, and memory means for storing an application, the application comprising:

means for selecting a model object;

means for designating objects having attributes to be revised;

means for selecting a global change operation for all of the designated objects having properties to be revised;

means for revising attributes of the model object; and means for propagating the revised attributes to the designated objects.

3. An application for revision of the value of attributes of selected objects as controlled by a computer system having at least a visual operator interface, an operating system for controlling the operation of program applications within the computer system, and memory for storing a program application, the application comprising:

means for designating objects, having attributes to be altered, modified, added or deleted (collectively, "revised");

means for selecting a global change operation for all of the designated objects having attributes to be revised;

means for selecting a model object from the designated objects;

means for revising attributes of the model object; and means for propagating the revised attributes to the designated objects.

4. A method for revision of the value of attributes of selected objects as controlled by a computer system having at least a visual operator interface, an operating system for controlling the operation of applications within the computer system, and memory for storing at least part of an application, the method comprising the steps of:

designating objects having attributes to be altered, modified, added, or deleted (collectively, "revised");

selecting a global change operation for all of the designated objects having attributes to be revised;

revising the attributes as desired; and propagating the revised attributes to the designated objects.

5. A method for revision of the value of attributes of designated properties of selected objects as controlled by a computer system having at least a visual operator interface, an operating system for controlling the operation of applications within the computer system, and memory means for storing an application, the method comprising the steps of:

selecting a model object;

designating objects having attributes to be revised;

selecting a global change operation for all of the designated objects having properties to be revised;

revising attributes of the model object; and propagating the revised attributes to the designated objects.

6. A method for revision of the value of attributes of selected objects as controlled by a computer system having at least a visual operator interface, an operating system for controlling the operation of applications within the computer system, and memory for storing at least part of an application, the method comprising the steps of:

designating objects having attributes to be altered, modified, added, or deleted (collectively, "revised");

selecting a global change operation for all of the designated objects having attributes to be revised;

selecting a model object from the designated objects;

revising attributes of the model object; and propagating the revised attributes to the designated objects.

* * * * *